(12) United States Patent
Wei (10) Patent No.: US 10,520,653 B2
(45) Date of Patent: Dec. 31, 2019

(54) GRATING LENS, LENS-TYPE GRATING, AND DISPLAY DEVICE

(71) Applicant: BOE Technology Group Co., Ltd., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 318 days.

(21) Appl. No.: 14/355,578

(22) PCT Filed: Dec. 16, 2013

(86) PCT No.: PCT/CN2013/089547
§ 371 (c)(1),
(2) Date: Apr. 30, 2014

(87) PCT Pub. No.: WO2015/024334
PCT Pub. Date: Feb. 26, 2015

(65) Prior Publication Data
US 2015/0205018 A1 Jul. 23, 2015

(30) Foreign Application Priority Data
Aug. 19, 2013 (CN) .......................... 2013 1 0362439

(51) Int. Cl.
*G02B 5/18* (2006.01)
*G02B 3/00* (2006.01)
(Continued)

(52) U.S. Cl.
CPC ............. *G02B 5/1876* (2013.01); *G02B 3/00* (2013.01); *G02B 3/06* (2013.01); *G02B 5/1819* (2013.01);
(Continued)

(58) Field of Classification Search
CPC .......... G02B 3/00; G02B 3/06; G02B 3/0056; G02B 5/18; G02B 5/1819; G02B 5/1876; G02B 5/1866; G02B 27/22; G02B 27/0961; G02B 27/2214; G02B 27/0087; G02B 27/2228; G02B 27/0037; H04N 13/0409; H04N 13/0497; H04N 13/0037; H04N 13/0434; H04N 13/004; H04N 13/0438; G06T 19/00
(Continued)

(56) References Cited

U.S. PATENT DOCUMENTS

2004/0070838 A1* 4/2004 Johnson ................... G02B 3/04
359/621
2012/0013602 A1* 1/2012 Lee ..................... G02B 27/2214
345/419

FOREIGN PATENT DOCUMENTS

CN 1537248 A 10/2004
CN 102053379 A 5/2011
(Continued)

OTHER PUBLICATIONS

First Office Action for corresponding Chinese Patent Application No. 201310362439.4, 5 pages, (dated Jan. 12, 2015).
(Continued)

*Primary Examiner* — Jie Lei
(74) *Attorney, Agent, or Firm* — Womble Bond Dickinson (US) LLP (57) ABSTRACT

A grating lens is disclosed. The grating lens is of a uniform columnar body, both shapes and sizes of respective cross sections perpendicular to an axis of the grating lens are the same, the grating lens includes sides formed of a plane and a cambered surface, an intersecting line between an oblique section of the grating lens and the cambered surface is a circular arc, and the oblique section is any section which forms a predetermined angle A with the axis of the grating lens and is perpendicular to the plane, where $0°<A<90°$. The present invention also discloses a lens-type grating and a display device which include the above grating lens.

19 Claims, 6 Drawing Sheets

(51) Int. Cl.
*G02B 3/06* (2006.01)
*G02B 27/22* (2018.01)
*G02B 27/00* (2006.01)

(52) U.S. Cl.
CPC ..... *G02B 27/0037* (2013.01); *G02B 27/2214* (2013.01)

(58) Field of Classification Search
USPC .............. 359/569, 463, 464, 466, 619, 923; 348/51–59; 345/419
See application file for complete search history.

(56) References Cited

FOREIGN PATENT DOCUMENTS

| | | |
|---|---|---|
| CN | 102331626 A | 1/2012 |
| CN | 102338951 A | 2/2012 |
| CN | 102981196 A | 3/2013 |
| CN | 103412359 A | 11/2013 |
| CN | 203433136 U | 2/2014 |
| JP | 2011248346 A | 12/2011 |
| WO | WO 2008/039004 A1 | 4/2008 |

OTHER PUBLICATIONS

PCT Notification of Transmittal of the International Search Report and the Written Opinion of the International Searching Authority, or the Declaration for PCT Counterpart Application No. PCT/CN2013/089547 Containing International Search Report, 13 pgs. (dated Mar. 27, 2014).
The International Preliminary Report on Patentability for Application No. PCT/CN2013/089547 dated Feb. 23, 2016, 12 pages.
Notification to Grant Patent Right for Invention in Chinese Application No. 201310362439.4 dated Mar. 24, 2015, 3 pages.

\* cited by examiner

GRATING LENS, LENS-TYPE GRATING, AND DISPLAY DEVICE

CROSS-REFERENCE TO RELATED APPLICATIONS

The present application is a U.S. National Stage under 35 U.S.C. § 371 of International Application No. PCT/CN2013/089547, filed on Dec. 16, 2013, entitled GRATING LENS, LENS-TYPE GRATING, AND DISPLAY DEVICE, designating the United States, and claiming priority to Chinese Patent Application No. 201310362439.4, filed with the State Intellectual Property Office of the PRC on Aug. 19, 2013 and entitled "Grating Lens, Lens-Type Grating, and Display Device."

FIELD OF THE INVENTION

The present invention relates to the field of display technology, in particular, relates to a grating lens, a lens-type grating, and a display device.

BACKGROUND OF THE INVENTION

Figure 1:
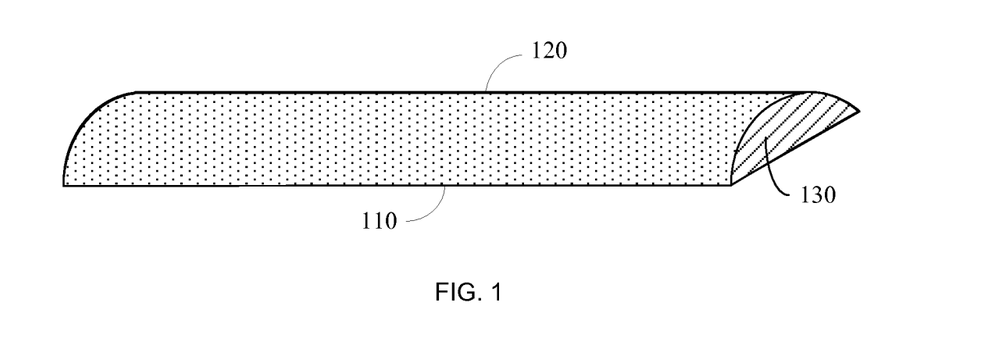
FIG. 1 is a schematic diagram of a lens used in a lens-type grating in the prior art.
Figure 2:
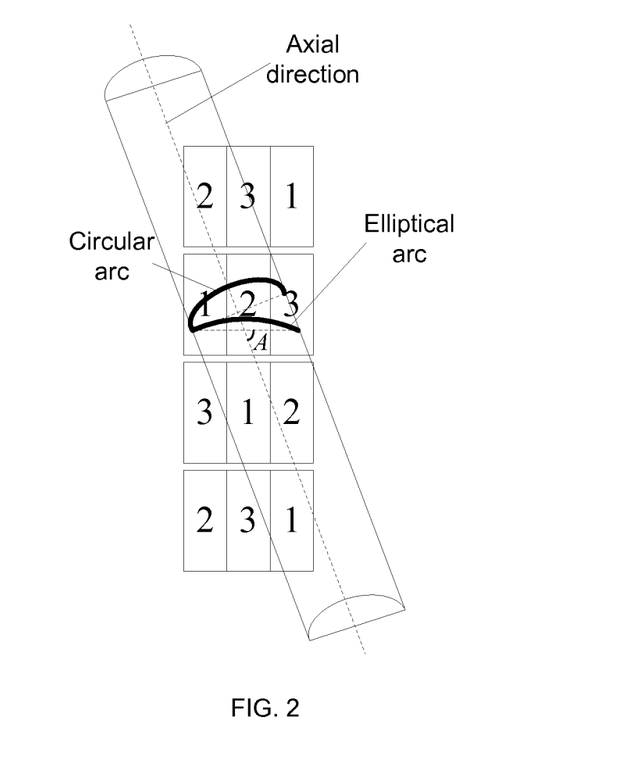
FIG. 2 is a schematic diagram illustrating arrangement of the lens in the lens-type grating in the prior art.
Figure 3:
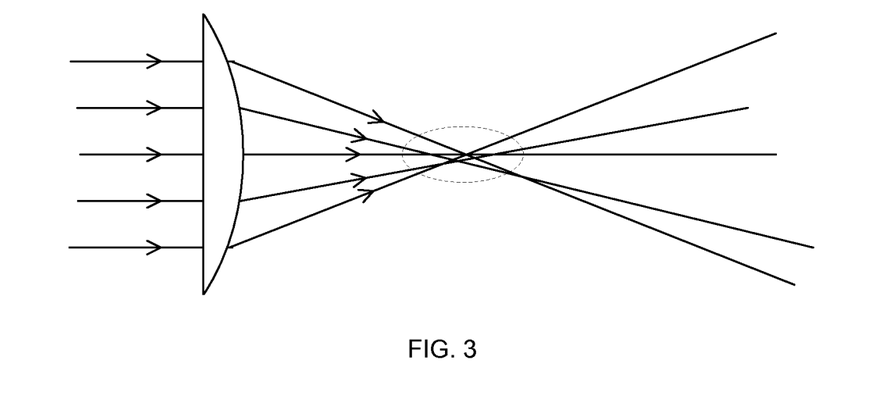
FIG. 3 is a schematic diagram illustrating principle of generation of a spherical aberration by the lens in the lens-type grating in the prior art.

A 3D grating is generally disposed at a light-outgoing side (i.e., a viewing side) of a display panel to constitute a 3D display device. When being used, an existing lens-type grating (which is one kind of 3D grating) is arranged such that a columnar lens thereof is obliquely disposed relative to a row and a column of pixels in the display panel. Specifically, as shown in FIG. 1, when a lens-type grating is designed and manufactured, the lens in the grating is formed of a part of a cylindrical lens (a part cut away from a cylinder along its axis direction). The lens in the grating includes sides formed of a plane 110 and a cambered surface 120, and two bottoms 130 which are perpendicular to both the plane 110 and the cambered surface 120. Wherein, the cambered surface 120 is a part of a side of the cylinder. As shown in FIG. 2 (a rectangle with reference number of 1, a rectangle with reference number of 2, and a rectangle with reference number of 3 represent viewpoint images displayed by different sub-pixels, sub-pixels with the same reference number form a complete viewpoint image; and different viewpoint images are images of the same object shot from different angles), when being used, the columnar lens of the lens-type grating is obliquely disposed. In this case, when viewed from a viewing side of a screen (the screen is perpendicular to a horizontal plane), an intersecting line between the cambered surface 120 and a section formed by the intersection of the horizontal plane and the lens is an elliptical arc. That is, the intersecting line between the cambered surface 120 and the section, which forms a predetermined angle A with an axial direction (a direction of a line connecting centers of the two bottoms 130) of the lens and is perpendicular to the plane 110 is the elliptical arc. The lens is obliquely disposed, which is equivalent to the fact that a lens with an elliptical cambered surface is arranged in front of the display panel. The lens with an elliptical cambered surface will also play the role of converging parallel light. However, focal lengths of the converging lens with an elliptical cambered surface are not uniform and a focus range is large (i.e., parallel light cannot converge at one point), which result in the fact that light output from the display panel generates a large spherical aberration after passing through the lens. As shown by the dashed oval frame in FIG. 3, light passing through the lens cannot converge at one point. The spherical aberration will increase a 3D crosstalk and further affects a 3D viewing angle to narrow down the viewing angle.

SUMMARY OF THE INVENTION

(I) Technical Problem to be Solved

The technical problem to be solved by the present invention is how to mitigate a phenomenon of spherical aberration generated after light passing through a lens in a lens-type grating.

(II) Technical Solutions

In order to solve the above technical problem, the present invention provides a grating lens. The grating lens is of a uniform columnar body, both shapes and sizes of respective cross sections perpendicular to an axis of the grating lens are the same, the grating lens includes sides formed of a plane and a cambered surface, wherein an intersecting line between an oblique section of the grating lens and the cambered surface is a circular arc, and the oblique section is any section which forms a predetermined angle A with the axis of the grating lens and is perpendicular to the plane, where $0°<A<90°$.

Wherein, an intersecting line between any cross section perpendicular to the axis of the grating lens and the cambered surface is a non-circular arc, a point $(x, y)$ on the circular arc and a point $(x', y')$ on the non-circular arc satisfy the following relationships:

$$x' = x \sin A \tag{1}$$

$$y' = y \tag{2}$$

where, the point $(x,y)$ is a point in a first coordinate system which has a midpoint of an intersecting line between the oblique section and the plane as an origin and is established in the oblique section, and the point $(x', y')$ is a point in a second coordinate system which has a midpoint of an intersecting line between the cross section and the plane as an origin and is established in the cross section;

a third coordinate system is established in the oblique section by having a circle center of the circular arc as an origin, in the third coordinate system, any point $(X, Y)$ on the circular arc satisfies the following equations:

$$X^2 + Y^2 = r^2 \tag{3}$$

$$Y = (r^2 - X^2)^{0.5} \tag{4}$$

$$L = (r^2 - P^2/4)^{0.5} \tag{5}$$

$$x = X \tag{6}$$

thus the following equation is obtained:

$$x' = X \sin A \tag{7}$$

from equations (2), (3), (4) and (5), the following equation is derived:

$$y' = y = Y - L = Y - (r^2 - P^2/4)^{0.5} = (r^2 - X^2)^{0.5} - (r^2 - P^2/4)^{0.5} \tag{8}$$

and from the above equations (7) and (8), coordinates of a point on the non-circular arc in the second coordinate system are obtained.

The present invention further provides a lens-type grating including a grating substrate, the lens-type grating further includes an array which is formed of the grating lenses as described above and is located on the grating substrate.

Wherein, a plane of the grating lens is a contact surface contacting with a surface of the grating substrate.

The present invention further provides a display device including a display panel, the display device further includes the lens-type grating as described above which is located at a light-outgoing side of the display panel.

Wherein, the grating lens is located at a side of the grating substrate which is far away from the display panel; or the grating lens is located at a side of the grating substrate which is close to the display panel.

Wherein, an axial direction of the grating lens and a lateral direction of a pixel array in the display panel form the predetermined angle A.

(III) Advantageous Effects

The present invention mitigates a phenomenon of spherical aberration generated after light passing through the grating lens by changing a surface shape of a grating lens in the prior art, i.e., by making an intersecting line between an oblique section of the grating lens and a cambered surface of the grating lens be a circular arc, such that a phenomenon of 3D crosstalk is mitigated and a viewing angle is increased.

DETAILED DESCRIPTION OF THE EMBODIMENTS

The present invention will be further described in detail below with reference to the drawings and embodiments. The following embodiments are for the purpose of explaining the present invention, but not intended to limit the scope of the present invention.

Embodiment 1

Figure 4:
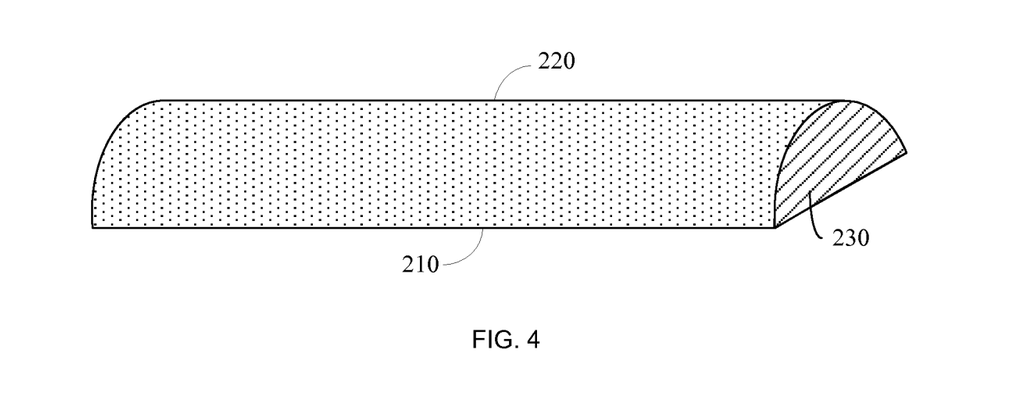
FIG. 4 is a schematic diagram of a grating lens according to an embodiment of the present invention.
Figure 5:
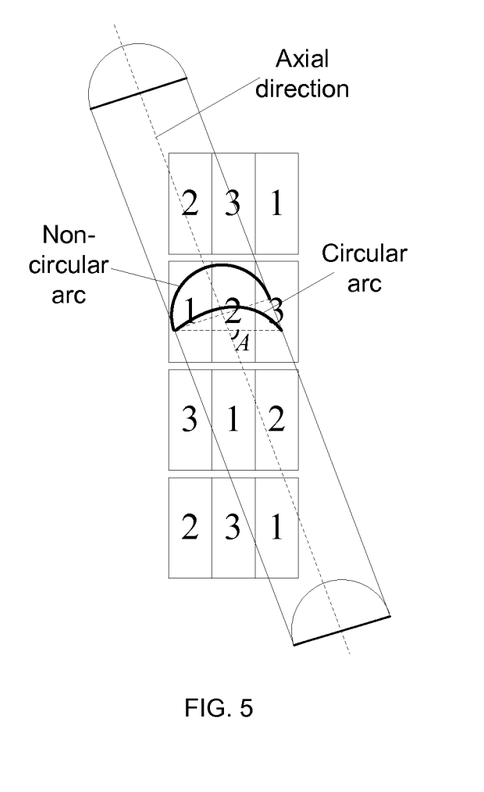
FIG. 5 is a schematic diagram illustrating arrangement of the grating lens in a lens-type grating according to an embodiment of the present invention.

The present embodiment provides a grating lens, i.e., a lens used for a 3D grating. The specific structure of the grating lens is shown in FIG. 4. The grating lens according to the present embodiment is of a uniform columnar body. Both shapes and sizes of respective cross sections perpendicular to an axis of the grating lens are the same, i.e., a surface shape of the grating lens is uniform. The grating lens includes sides formed of a plane 210 and a cambered surface 220, and of course one bottom 230 at each of both ends of the grating lens. As shown in FIG. 5, since the grating lens is obliquely arranged relative to a row and a column of pixels in a display device when the grating lens is in use, in order to mitigate the phenomenon of spherical aberration generated by light passing through the grating lens, an intersecting line between an oblique section and the cambered surface 220 of the grating lens according to the present embodiment is a circular arc, i.e., a segment of a circle. The oblique section is any section which forms a predetermined angle A with the axis of the grating lens and is perpendicular to the plane 210, where 0°<A<90°. The axis of the grating lens is a line connecting the centers of the two bottoms 230 of the grating lens (which is of a uniform columnar body). In this case, an intersecting line between any section perpendicular to the axis of the grating lens and the cambered surface 220 is a non-circular arc.

Figure 6:
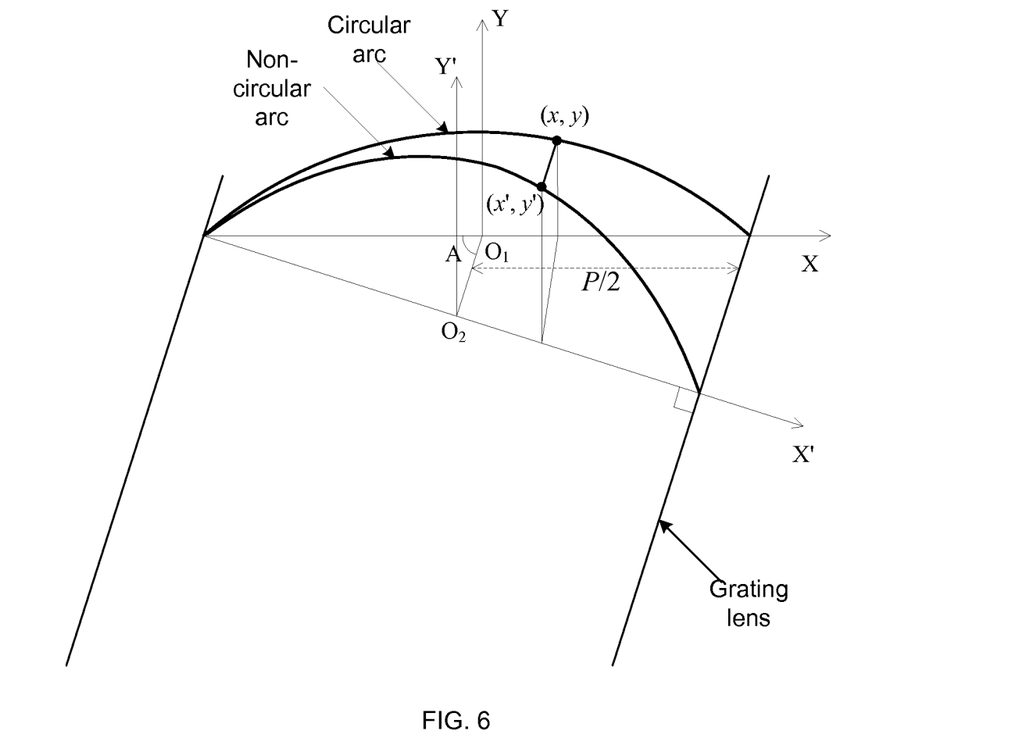
FIG. 6 is a schematic diagram illustrating derivation of a radius of a circular arc formed by intersection of an oblique section and a cambered surface of the grating lens according to an embodiment of the present invention.

Since the cambered surface 220 of the grating lens according to the present embodiment is no longer a cambered surface of a cylinder, in the present embodiment, a shape of the above non-circular arc is determined by pre-determining a radius r of the circular arc formed by intersection between the above oblique section and the cambered surface 220, a grating pitch P of the grating lens, and the angle A, so as to determine a shape of the whole cambered surface 220. As shown in FIG. 6, a point (x,y) on the circular arc and a point (x',y') on the non-circular arc satisfy the following relationships:

$$x' = x \sin A \quad (1)$$

$$y' = y \quad (2)$$

where, the point (x,y) is a point in a first coordinate system which has a midpoint of an intersecting line between the oblique section and the plane 210 as an origin $O_1$ and is established in the oblique section (a plane where $XO_1Y$ is located in FIG. 6), and the point (x',y') is a point in a second coordinate system which has a midpoint of an intersecting line between the cross section and the plane 210 as an origin $O_2$ and is established in the cross section (a plane where $X'O_2Y'$ is located in FIG. 6).

Figure 7:
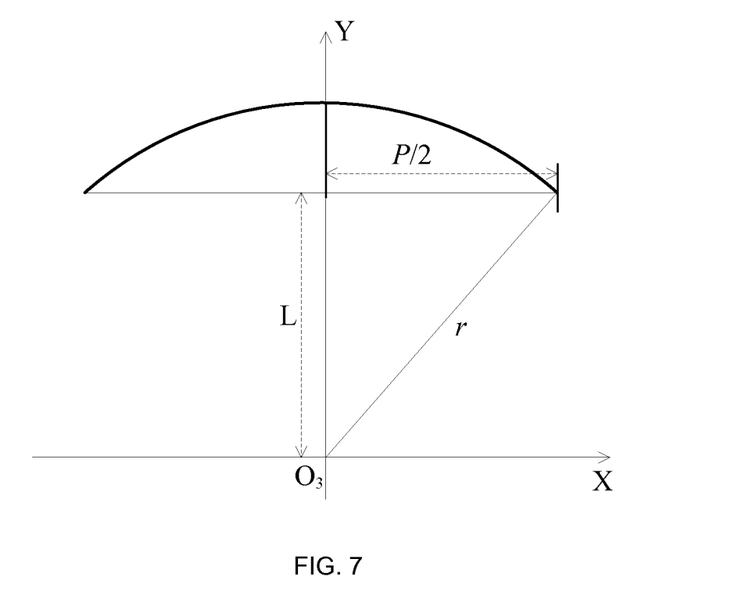
FIG. 7 is a schematic diagram illustrating a method for calculating the radius of the circular arc.

When the grating lens is manufactured, a third coordinate system $XO_3Y$ may be established in the oblique section by having a circle center of the circular arc as an origin $O_3$, as shown in FIG. 7. In the third coordinate system $XO_3Y$, any point (X, Y) on the circular arc satisfies the following equations:

$$X^2 + Y^2 = r^2 \quad (3)$$

$$Y = (r^2 - X^2)^{0.5} \quad (4)$$

$$L = (r^2 - P^2/4)^{0.5} \quad (5)$$

From comparison between FIG. 6 and FIG. 7, it can be seen that:

$$x = X \quad (6)$$

Thus, the following equation can be obtained:

$$x' = X \sin A \quad (7)$$

From equations (2), (3), (4) and (5), the following equation can be derived:

$$y' = y = Y - L = Y - (r^2 - P^2/4)^{0.5} = (r^2 - X^2)^{0.5} - (r^2 - P^2/4)^{0.5} \quad (8)$$

And from the above equations (7) and (8), coordinates of a point on the non-circular arc in the second coordinate system can be obtained.

Figure 8:
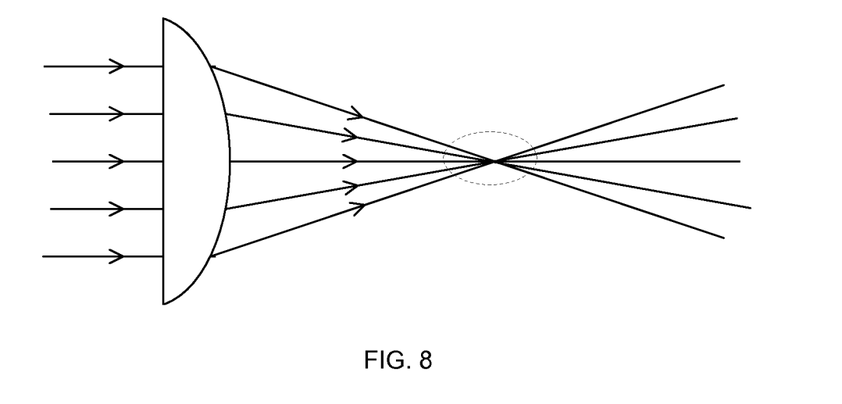
FIG. 8 is a schematic diagram illustrating principle of mitigation of a phenomenon of spherical aberration by the grating lens according to an embodiment of the present invention.

In the present embodiment, the surface shape of the grating lens can be determined by the predetermined angle A. As shown in FIG. 8, compared with an existing lens, the surface shape of the lens according to the present embodiment is not of a part of the side of a cylinder (i.e., a circular cambered surface) but a cambered surface of the non-circular arc. The grating lens is obliquely arranged when it is in use and an intersecting line between an oblique section and the cambered surface 220 is a circular arc, which is equivalent to the fact that a lens having a surface shape of circularly cambered surface is arranged at a light-outgoing side of a display panel. Compared with a lens with the elliptical cambered surface, the grating lens according to the present embodiment causes light passing through to substantially converge at one point, thus the phenomenon of spherical aberration generated after light passing through the grating lens. Therefore, the phenomenon of 3D crosstalk is mitigated and the viewing angle is increased.

Embodiment 2

The present embodiment provides a lens-type grating including a grating substrate and a grating-lens array located on the grating substrate, wherein the grating-lens array is formed of grating lenses according to Embodiment 1 (i.e., the grating lens as shown in FIG. 4). The grating-lens array on the grating substrate corresponds to a pixel array in a corresponding display device. To facilitate manufacture, the plane 210 of the grating lens is a contact surface contacting with a surface of the grating substrate. Since the grating lens according to Embodiment 1 is used, the lens-type grating according to the present embodiment mitigates the phenomenon of 3D crosstalk when used.

Embodiment 3

The present embodiment provides a display device including a display panel and a lens-type grating at a viewing side of the display panel, wherein a lens in the lens-type grating is the grating lens according to Embodiment 1. Wherein, an axial direction of the grating lens and a lateral direction of a pixel array in the display panel form a predetermined angle A, and the predetermined angle A is generally 70°~85°.

Figure 9:
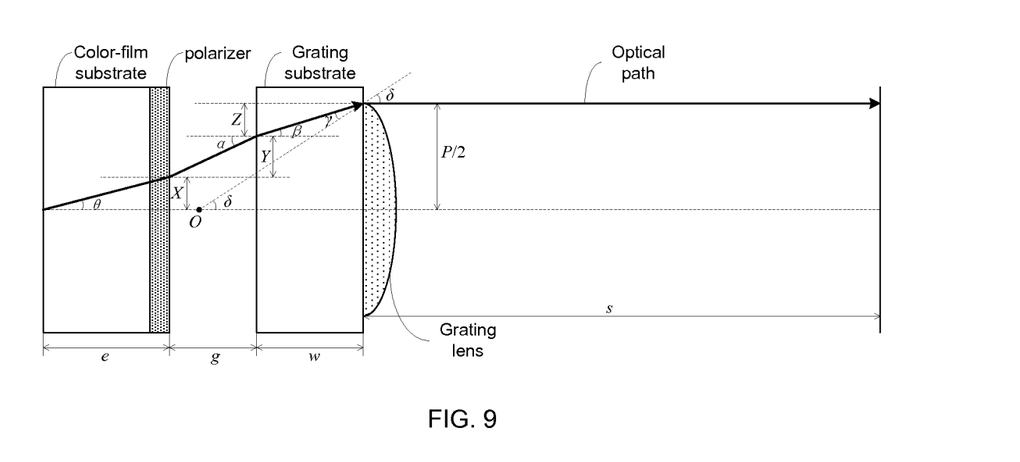
FIG. 9 is an optical path diagram at a light-outgoing side of a display device including the grating lens according to an embodiment of the present invention.
Figure 10:
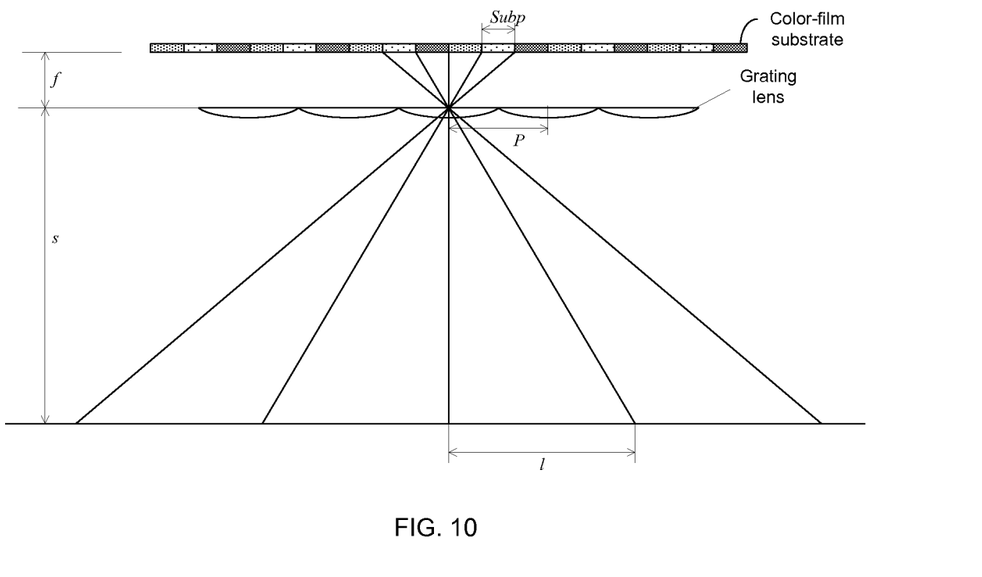
FIG. 10 is an elementary diagram illustrating display by a 3D grating.

In the present embodiment, the grating lens is located at the side of the grating substrate which is far away from the display panel. An optical path diagram at a light-outgoing side of the display device is shown in FIG. 9, where, e is the sum of the thickness of a color-film substrate and the thickness of a polarizer, g is the distance between the grating substrate and the polarizer, w is the thickness of the grating substrate (g and w are determined according to a practical situation, for example, when there is no grating substrate, i.e., the grating lens is directly attached to the polarizer, both g and w are zero), r is a radius of a circle corresponding to a circular arc formed of an intersecting line between an oblique section of the grating lens and the cambered surface of the grating lens, and O is a circle center of the circle corresponding to the circular arc formed of the intersecting line between the oblique section of the grating lens and the cambered surface of the grating lens. As shown in FIG. 10, f is the distance between the grating lens and the display panel, s is the distance between the lens-type grating and eyes of a person, Subp is the width of a sub-pixel in the display device, P is a grating pitch (i.e. a horizontal distance between axes of two adjacent grating lenses), n is the number of viewpoint images, and n may be a natural number greater than or equal to 2. f, P, and r can be obtained according to the following equations.

$$\frac{f}{s} = \frac{Subp}{l} \tag{9}$$

$$\frac{P}{n \cdot Subp} = \frac{s}{s+f} \tag{10}$$

$$P = \frac{n \cdot Subp}{1 + Subp/l} \tag{11}$$

$$\sin\alpha = n\sin\theta \tag{12}$$

$$\sin\alpha = n\sin\beta \tag{13}$$

$$1 + \cot^2\alpha = \csc^2\alpha \tag{14}$$

$$\tan\alpha = \frac{n\tan\theta}{\sqrt{1 + (1-n^2)\tan^2\theta}} \tag{15}$$

$$X + Y + Z = P/2 \tag{16}$$

$$X = e\tan\theta \tag{17}$$

$$Y = g\tan\alpha \tag{18}$$

$$Z = w\tan\beta \tag{19}$$

$$e\tan\theta + g\tan\alpha + w\tan\beta = P/2 \tag{20}$$

$$\frac{g \cdot n\tan\theta}{\sqrt{1 + (1-n^2)\tan^2\theta}} = P/2 - (e+w)\tan\theta \tag{21}$$

$$\sin\delta = n\sin\gamma \tag{22}$$

$$\delta = \beta + \gamma \tag{23}$$

$$\sin\delta = P/(2r) \tag{24}$$

As shown in FIG. 10, after s, l, n and Subp are determined, f can be obtained from equation (9), and P can be obtained from equations (10) and (11). r can be obtained according to the optical path shown in FIG. 9 and equations (12)~(24). A specific solving process is as follows:

Since the shapes of the color-film substrate, the polarizer, and the grating substrate are all determined, an incident angle and an emergence angle of light when it refracts by passing through the color-film substrate, the polarizer, and the grating substrate are all known, i.e., θ, α and β are all known. Equations (12)(15) explain the relationships among θ, α and β, and equations (16)~(21) explain the relationships among P, θ, α and β. After the grating pitch P and a refraction angle θ of light incident onto the color-film substrate are determined, an angle δ (δ is an included angle between a line connecting the circle center O with the edge of the grating lens and a horizontal direction, wherein the circle center O is the circle center of the circle corresponding to the circular arc formed of the intersecting line between the oblique section of the grating lens and the cambered surface of the grating lens) can be obtained according to the relationship between different angles when light refracts as well as equations (22) and (23), thus r can be calculated from the equation (24).

In the present embodiment, r can be determined through the grating pitch P, which is equivalent to the fact that the size of the grating lens is determined.

Embodiment 4

The present embodiment provides another display device including a display panel and a lens-type grating at a viewing side of the display panel, wherein a lens in the lens-type grating is the grating lens according to Embodiment 1. Wherein, an axial direction of the grating lens and a lateral direction of a pixel array in the display panel form a predetermined angle A, and the predetermined angle A is generally 70°~85°.

Figure 11:
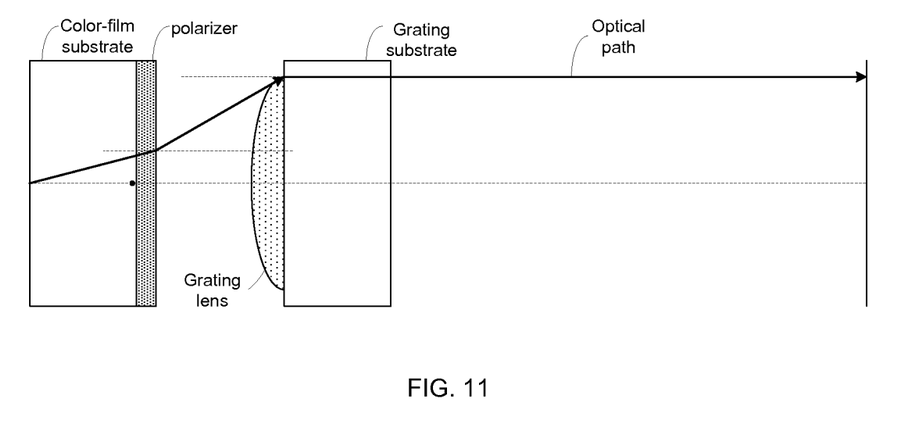
FIG. 11 is an optical path diagram at a light-outgoing side of another display device including the grating lens according to an embodiment of the present invention.

In the display device according to the present embodiment, the grating lens is located at the side of the grating substrate which is close to the display panel. Since the shape of the grating lens according to Embodiment 1 is approximate to a shape of an ideal lens, reverse arrangement of the grating lens on the grating substrate (i.e., the cambered surface of the grating lens facing the display panel) will also plays the same role in convergence. An optical path diagram at a light-outgoing side of the display device according to the present embodiment is shown in FIG. 11.

The grating lens in the above Embodiment 4 is located at the side of the grating substrate which is close to the display panel. Light passing through the grating lens is subject to reflection and refraction by the grating substrate, thus a 3D viewing angle and a contrast will be affected to a certain extent. However, the grating lens in the Embodiment 3 is located at the side of the grating substrate which is far away from the display panel. Light passing through the grating lens is no longer subject to reflection and refraction by the grating substrate, thus both a 3D viewing angle and a contrast are increased compared with Embodiment 4.

In a practical application, the desired r and P may be obtained through the optical path diagram in Embodiment 3 or Embodiment 4, and coordinates (x', y') on the non-circular arc may be obtained from the equations in Embodiment 1 in combination with the predetermined angle A, thus the grating lens is manufactured.

The foregoing embodiments are only for the purpose of explaining the present invention, but not intended to limit the present invention. Various modifications and variations can be easily made by a person having ordinary skill in the art without departing from the spirit and the scope of the present invention. Thus, all of the equivalent technical solutions thereof also fall within the scope of the present invention. Therefore, the protection scope of the present invention should be defined by the claims.

What is claimed is:

1. A grating lens consisting of one plane, one cambered surface, and two bottoms at both ends of the grating lens, an axis of the grating lens being a line connecting centers of the two bottoms, wherein the grating lens is of a uniform columnar body, shapes and sizes of respective cross sections perpendicular to the axis are uniform, respectively, the grating lens includes sides formed of the plane and the cambered surface, an intersecting line between an oblique section of the grating lens and the cambered surface is a circular arc, and the oblique section is any section which forms a predetermined angle A with the axis of the grating lens and is perpendicular to the plane, wherein the predetermined angle A ranges from 70° to 85°, and wherein the cambered surface of the grating lens is configured to where the grating lens is arranged at a light-outgoing side of a display panel and the axis of the grating lens forms the predetermined angle A with a row of pixels in the display panel, converge parallel light from a pixel of the row of pixels of the display panel at one point.

2. The grating lens according to claim 1, wherein an intersecting line between any cross section perpendicular to the axis of the grating lens and the cambered surface is a non-circular arc, a point (x, y) on the circular arc and a point (x', y') on the non-circular arc satisfy the following relationships:

$$x' = x \sin A \quad (1)$$

$$y' = y \quad (2)$$

where, the point (x, y) is a point in a first coordinate system which has a midpoint of an intersecting line between the oblique section and the plane as an origin and is established in the oblique section, and the point (x', y') is a point in a second coordinate system which has a midpoint of an intersecting line between the cross section and the plane as an origin and is established in the cross section;

a third coordinate system is established in the oblique section by having a circle center of the circular arc as an origin, in the third coordinate system, any point (X, Y) on the circular arc satisfies the following equations:

$$X^2 + Y^2 = r^2 \quad (3)$$

$$Y = (r^2 - X^2)^{0.5} \quad (4)$$

$$L = (r^2 - P^2/4)^{0.5} \quad (5)$$

$$x = X \quad (6)$$

thus the following equation is obtained:

$$x' = X \sin A \quad (7)$$

from equations (2) (3), (4) and (5), the following equation is derived:

$$y' = y = Y - L = Y - (r^2 - P^2/4)^{0.5} = (r^2 - X^2)^{0.5} - (r^2 - P^2/4)^{0.5} \quad (8)$$

and from the above equations (7) and (8), coordinates of a point on the non-circular arc in the second coordinate system are obtained, wherein r is a radius of the circular arc formed by intersection between the oblique section and the cambered surface, L is a distance from the circle center of the circular arc to the plane of the grating lens, and P is a grating pitch of the grating lens.

3. A lens-type grating including a grating substrate, wherein the lens-type grating further includes an array which is formed of grating lenses and is located on the grating substrate, each of the grating lenses is consisted of one plane, one cambered surface, and two bottoms at both ends of the grating lens, an axis of the grating lens is a line connecting centers of the two bottoms, each of the grating lenses is of a uniform columnar body, shapes and sizes of respective cross sections perpendicular to the axis are uniform, respectively, the grating lens includes sides formed of the plane and the cambered surface, an intersecting line between an oblique section of the grating lens and the cambered surface is a circular arc, and the oblique section is any section which forms a predetermined angle A with the axis of the grating lens and is perpendicular to the plane, wherein the predetermined angle A ranges from 70° to 85°; and wherein the cambered surface of the grating lens is configured to where the grating lens is arranged at a light-outgoing side of a display panel and the axis of the grating lens forms the predetermined angle A with a row of pixels in the display panel, converge parallel light from a pixel of the row of pixels of the display panel at one point.

4. The lens-type grating according to claim 3, wherein a plane of the grating lens is a contact surface contacting with a surface of the grating substrate.

5. The lens-type grating according to claim 3, wherein an intersecting line between any cross section perpendicular to the axis of the grating lens and the cambered surface is a non-circular arc, a point (x, y) on the circular arc and a point (x', y') on the non-circular arc satisfy the following relationships:

$$x'=x \sin A \tag{1}$$

$$y'=y \tag{2}$$

where, the point (x, y) is a point in a first coordinate system which has a midpoint of an intersecting line between the oblique section and the plane as an origin and is established in the oblique section, and the point (x', y') is a point in a second coordinate system which has a midpoint of an intersecting line between the cross section and the plane as an origin and is established in the cross section;

a third coordinate system is established in the oblique section by having a circle center of the circular arc as an origin, in the third coordinate system, any point (X, Y) on the circular arc satisfies the following equations:

$$X^2+Y^2=r^2 \tag{3}$$

$$Y=(r^2-X^2)^{0.5} \tag{4}$$

$$L=(r^2-P^2/4)^{0.5} \tag{5}$$

$$x=X \tag{6}$$

thus the following equation is obtained:

$$x'=X \sin A \tag{7}$$

from equations (2), (3), (4) and (5), the following equation is derived:

$$y'=y=Y-L=Y-(r^2-P^2/4)^{0.5}=(r^2-X^2)^{0.5}-(r^2-P^2/4)^{0.5} \tag{8}$$

and from the above equations (7) and (8), coordinates of a point on the non-circular arc in the second coordinate system are obtained, wherein r is a radius of the circular arc formed by intersection between the oblique section and the cambered surface, L is a distance from the circle center of the circular arc to the plane of the grating lens, and P is a grating pitch of the grating lens.

6. The lens-type grating according to claim 5, wherein a plane of the grating lens is a contact surface contacting with a surface of the grating substrate.

7. A display device including a display panel, wherein the display device further includes a lens-type grating which is located at a light-outgoing side of the display panel, the lens-type grating includes a grating substrate, wherein the lens-type grating further includes an array which is formed of grating lenses and is located on the grating substrate, each of the grating lenses is consisted of one plane, one cambered surface, and two bottoms at both ends of the grating lens, an axis of the grating lens is a line connecting centers of the two bottoms, each of the grating lenses is of a uniform columnar body, shapes and sizes of respective cross sections perpendicular to the axis are uniform, respectively, the grating lens includes sides formed of the plane and the cambered surface, an intersecting line between an oblique section of the grating lens and the cambered surface is a circular arc, and the oblique section is any section which forms a predetermined angle A with the axis of the grating lens and is perpendicular to the plane, wherein the predetermined angle A ranges from 70° to 85°; and wherein the cambered surface of the grating lens is configured to where the grating lens is arranged at a light-outgoing side of a display panel and the axis of the grating lens forms the predetermined angle A with a row of pixels in the display panel, converge parallel light from a pixel of the row of pixels of the display panel at one point.

8. The display device according to claim 7, wherein the grating lens is located at a side of the grating substrate which is far away from the display panel.

9. The display device according to claim 8, wherein an axial direction of the grating lens and a lateral direction of a pixel array in the display panel form the predetermined angle A.

10. The display device according to claim 7, wherein the grating lens is located at a side of the grating substrate which is close to the display panel.

11. The display device according to claim 10, wherein an axial direction of the grating lens and a lateral direction of a pixel array in the display panel form the predetermined angle A.

12. The display device according to claim 7, wherein an axial direction of the grating lens and a lateral direction of a pixel array in the display panel form the predetermined angle A.

13. The display device according to claim 7, wherein an intersecting line between any cross section perpendicular to the axis of the grating lens and the cambered surface is a non-circular arc, a point (x, y) on the circular arc and a point (x', y') on the non-circular arc satisfy the following relationships:

$$x'=x \sin A \tag{1}$$

$$y'=y \tag{2}$$

where, the point (x, y) is a point in a first coordinate system which has a midpoint of an intersecting line between the oblique section and the plane as an origin and is established in the oblique section, and the point (x', y') is a point in a second coordinate system which has a midpoint of an intersecting line between the cross section and the plane as an origin and is established in the cross section;

a third coordinate system is established in the oblique section by having a circle center of the circular arc as an origin, in the third coordinate system, any point (X, Y) on the circular arc satisfies the following equations:

$$X^2+Y^2=r^2 \tag{3}$$

$$Y=(r^2-X^2)^{0.5} \tag{4}$$

$$L=(r^2-P^2/4) \tag{5}$$

$$x=X \tag{6}$$

thus the following equation is obtained:

$$x'=X \sin A \tag{7}$$

from equations (2), (3), (4) and (5), the following equation is derived:

$$y'=y=Y-L=Y-(r^2-P^2/4)^{0.5}=(r^2-X^2)^{0.5}-(r^2-P^2/4)^{0.5} \tag{8}$$

and from the above equations (7) and (8), coordinates of a point on the non-circular arc in the second coordinate system are obtained, wherein r is a radius of the circular arc formed by intersection between the oblique section and the cambered surface, L is a distance from the circle center of the circular arc to the plane of the grating lens, and P is a grating pitch of the grating lens.

14. The display device according to claim 13, wherein a plane of the grating lens is a contact surface contacting with a surface of the grating substrate.

15. The display device according to claim 13, wherein the grating lens is located at a side of the grating substrate which is far away from the display panel.

16. The display device according to claim 13, wherein the grating lens is located at a side of the grating substrate which is close to the display panel.

17. The display device according to claim 13, wherein an axial direction of the grating lens and a lateral direction of a pixel array in the display panel form the predetermined angle A.

18. The display device according to claim 7, wherein a plane of the grating lens is a contact surface contacting with a surface of the grating substrate.

19. The display device according to claim 18, wherein an axial direction of the grating lens and a lateral direction of a pixel array in the display panel form the predetermined angle A.

* * * * *